3,311,600
COPOLYMERS OF ALPHA-MONOOLEFINS AND OMEGA-HALO-MONO-ALPHA-OLEFINS
Robert Bacskai, Berkeley, Calif., assignor to Chevron Research Company, a corporation of Delaware
No Drawing. Filed June 12, 1964, Ser. No. 374,807
6 Claims. (Cl. 260—87.5)

This application is a continuation-in-part of my copending applications, Ser. No. 269,139 filed Mar. 29, 1963, and now abandoned, and Ser. No. 304,958, filed Aug. 27, 1963, and now abandoned.

This invention concerns copolymers of hydrocarbon α-olefins and monohalo-substituted α-olefins and the method of their preparation. More particularly, this invention concerns copolymers of hydrocarbon α-olefins and monohalo-substituted α-olefins and an improved method for their preparation with a "Ziegler-type" catalyst.

Polymers of hydrocarbon α-olefins have found a wide variety of applications; the polymers find use as films, fibers, molded objects, etc. In many applications of the polymers, it is advantageous to have a reactive functionality, such as a halogen, appearing intermittently but regularly along the polymeric chain. The functionality serves as a "handle" for modification of the polymer. Halogens are useful for introducing ionic sites, such as by reaction with amines, or for cross-linking to modify the physical properties of the polymer.

Halogens can be introduced into the polymer by halogenation after the polymer has been formed. Various references in the prior art disclose a variety of methods for introducing halogen into the polymer. However, halogenation has a number of serious drawbacks. First, halogenation frequently results in degradation of the polymer. Second, halogenation occurs in a number of positions on the polymer, replacing different types of hydrogen, i.e., primary, secondary, or tertiary. Therefore, in subsequent reactions, a variety of mechanisms will be operative. Third, in order to have a sufficient number of reactive sites, an excessive amount of halogen may be required to be introduced into the molecule. Finally, the halogens which are bonded to the backbone of the polymer may significantly change the physical properties of the polymer.

As for introducing haloolefins into the polymer by copolymerizing a haloolefin with a hydrocarbon α-olefin, it is reported in the literature that halo-substituted olefins could be used to control molecular weight, i.e., U.S. Patent No. 3,029,231. The halogenated compounds used were vinyl chloride and vinyl bromide. It was also found that these compounds were not incorporated in the polymer under "Ziegler-type" polymerization conditions. When allyl chloride is introduced into the polymerization reaction medium, the polymerization is greatly inhibited, yielding little, if any, high molecular weight polymer.

It has now been found that the novel copolymers of this invention, comprising hydrocarbon α-olefins and from 1 to 30 mole or number percent of ω-monohalo-substituted α-olefins, can be obtained in greatly enhanced yields by introducing into the Ziegler polymerization media an organic Lewis base having at least 1 heteroatom of atomic number 7 to 8, i.e., nitrogen or oxygen, wherein all the valences of the heteroatom are to carbon.

The hydrocarbon addition polymerizable α-olefins which find use are of from 2 to 10 carbons, preferably of from 2 to 8 carbons, and particularly preferred of from 3 to 6 carbons. The α-olefins all have the vinyl group, i.e., $CH_2=CH-$. Illustrative of olefins in the range are ethylene, propylene, butene-1, pentene-1, octene-1, decene-1, 4-methylpentene-1, 3-methylpentene-1, isohexene-1, etc. The monomers may be used individually or in combination.

The monohaloolefins which find use are ω-haloolefins of at least 4 carbons having the following formula:

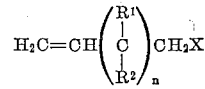

wherein $n$ varies from 1 to 9, X is halogen of atomic number 17 to 35, i.e., chlorine and bromine, $R^1$ and $R^2$ are hydrogen or lower alkyl, preferably hydrogen; however, an alkyl group must be at least beta to an olefinic double bond. That is, the carbon alpha to the olefinic double bond must be free of substituents or, stated differently, bonded to two hydrogens.

Illustrative of ω-monohalo-substituted α-olefins are 4-chlorobutene-1, 6-bromohexene-1, 4-methyl-5-bromopentene-1, 7-bromoheptene-1, 10-chlorodecene-1, 5,5-dimethyl-7-bromoheptene-1, 9-chlorononene-1, 9-bromononene-1, 10-bromodecene-1, 12-bromododecene-1, 12-chlorododecene-1, 4,6-dimethyl-8-bromooctene-1, etc. The ω-monohaloolefins will generally be in the range of 4 to 16 carbons, more usually in the range of 4 to 12 carbons.

The catalysts for the polymerization with which the Lewis bases are used are "Ziegler-type" catalysts having an organo-aluminum compound and a titanium or vanadium compound. The organo-aluminum compounds are trihydrocarbyl aluminum, dihydrocarbyl aluminum halide and hydrocarbyl aluminum sesquihalide, wherein the hydrocarbyl group is from 1 to 10 carbons, preferably of from 1 to 6 carbons. (Hydrocarbyl is a monovalent radical containing only carbon and hydrogen and may be aliphatic, alicyclic or aromatic.) The hydrocarbyl aluminum compounds have a ratio of hydrocarbyl groups to aluminum of greater than 1, i.e., 1.5 to 3. The halide can be fluoride, chloride, bromide or iodide, but is preferably chloride.

Both titanium and vanadium compounds can be used with the above aluminum compounds depending on the particular polymer desired. Where a polymer of a hydrocarbon α-olefin of at least 3 carbons is desired, e.g., propylene, 4-methylpentene-1, butene-1, etc., titanium cocatalyst would be used with trihydrocarbyl aluminum or dihydrocarbyl aluminum halide. On the other hand, if a combination of hydrocarbon α-olefins, such as ethylene-propylene, is desired, a vanadium co-catalyst would be used. Either the vanadium or titanium compounds can be used with ethylene.

The titanium and vanadium catalyst compounds are halides. Preferably, the halogen has an atomic number of 17 to 35, and particularly preferred are the chlorides. Other elements such as oxygen may be present, as in vanadium oxychloride.

Illustrative of various aluminum compounds are diethyl aluminum chloride, tributyl aluminum, trihexyl aluminum, ethyl aluminum sesquihalide, diethyl aluminum bromide, etc. Illustrative of compounds of metals of atomic number 22 to 23, i.e., titanium and vanadium, are titanium trichloride, titanium tribromide, vanadium trichloride, vanadium oxytrichloride, vanadium pentachloride, vanadium tribromide, etc. The preferred catalysts are titanium trichloride, vanadium oxychloride and vanadium trichloride.

The mole ratio of the aluminum compound to the titanium or vanadium compound is usually in the range of 1–5:1, preferably 2–4:1. The ratio of moles of titanium to solvent will usually be in the range of about 0.1 to 5 mM./100 ml. solvent, preferably 0.5 to 2 mM./100 ml. solvent.

The Lewis bases which find use are ethers and tert.-amines. The Lewis bases may be aliphatic, cycloaliphatic, aromatic or heterocyclic with the oxygen or nitrogen serving as the annular member. The Lewis bases will usually be from about 2 to 20 carbons and more generally 4 to 18 carbons.

The useful ethers have the following formula:

$$R\text{—}O\text{—}R'$$

wherein R and R' are hydrocarbyl and together are of not more than 20 carbons. R and R' may be the same or different; they may be aliphatic, cycloaliphatic, aromatic, aralkyl or alkaryl; they may be taken together to form a ring with the oxygen to which they are attached. Preferred R and R' are lower alkyl or divalent aliphatic organic radicals of from 4 to 6 carbons forming a ring of at least 5 members with the oxygen to which the divalent radical is attached.

Illustrative of ethers are tetrahydrofuran, diethyl ether, dibutyl ether, phenetole, anisole, benzyl ethyl ether, 4H-pyran, 1,2-dimethoxyethylene, etc. Although the ether may be a polyether, preferred compounds are monoethers.

The tert.-amines are of two types as represented by the following formulae:

(a) 

(b) 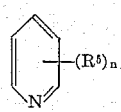

Formula a is concerned with simple tert.-amines, as well as cyclic amines, while Formula b is concerned with pyridine and alkyl-substituted pyridines. As already indicated, the amines of type (a) are generally of not more than 20 carbons; however, $R^2$, $R^3$ or $R^4$ will rarely be individually of more than 10 carbons and generally of not more than 6 carbons. $R^2$, $R^3$ and $R^4$ may be the same or different; they may be aliphatic, cycloaliphatic, aromatic, aralkyl and alkaryl. They may be saturated or aliphatically unsaturated, e.g., ethylenic. Preferred amines are tri-lower-alkyl amines and cyclic amines where $R^2$ and $R^3$ are of from 4 to 6 carbons and form a divalent radical which forms a ring of at least 5 annular members with the nitrogen to which they are attached, i.e., pyrrolidine and piperidine.

The other type of tert.-amines are pyridines and alkyl-substituted pyridines. $R^5$ will generally not be of more than 6 carbons and more usually of not more than 3 carbons; n is a cardinal number and varies from 0 to 3.

Illustrative of amines which come within the scope of this invention are triethylamine, hexyldimethylamine, N-methyl piperidine, picoline, lutidine, collidine, N-methyl pyrrole, N-ethyl pyrrolidine, cyclohexyldiethylamine, p-tolyldipropylamine, etc. Although the amine can be a polyamine, such as N,N'-dimethyl-1,4-piperazine or N,N,N',N'-tetramethyl-p-phenylenediamine, monoamines are preferred.

The Lewis base will generally be in a mole ratio of about 0.2 to 5 per atom of metal of atomic number 22 to 23, preferably the mole ratio will be in the range of about 0.75 to 2.5.

The temperature at which the polymerization is carried out is generally in the range of about 35° C. to 100° C., depending on the monomer, the catalyst, etc. When the monomer is a gas, the pressure may vary from 10 to 2,000 p.s.i., more usually in the range of about 10 to 200 p.s.i. When the monomer is a liquid, such as 4-methylpentene-1 or 3-methylpentene-1, the concentration of monomer will usually be in the range of about 5% to 50% by weight of the solution or may serve as its own solvent (100%).

The time for the reaction will generally be at least one-half hour and will rarely exceed 24 hours. The time is not critical and will generally be in the range of about 1 hour to 6 hours.

The solvents for the polymerization are usually hydrocarbons, either aliphatic or aromatic. Aliphatic hydrocarbons from 7 to 10 carbons are preferred.

The polymers will generally have from about 1 to 30 number percent of the haloolefin monomer (70–99% of hydrocarbon α-olefin). More usually, the polymer will have from about 2–10% by weight (based on total polymer). Calculated in a different way, the polymer will have from about 0.1 to 15% by weight of halogen based on total polymer.

Illustrative of various copolymers are ethylene with 6-chlorohexene-1, propylene with 6-chlorohexene-1, 1-butene with 6-chlorohexene-1, 4-methylpentene-1 with 6-chlorohexene-1, the same hydrocarbon α-olefins with 6-bromohexene-1, 8-chlorooctene-1, 8-bromooctene-1, 10-chlorodecene-1, and 10-bromodecene-1.

The following examples are offered by way of illustration and not by way of limitation.

*Example 1*

Into a pressure vessel was introduced 200 ml. of dry n-heptane, 2.3 grams of 8-bromooctene-1, 3 mM. of triethyl aluminum, 1 mM. pyridine, 1 mM. Ti as titanium trichloride AA (aluminum activated titanium trichloride; $3TiCl_3 \cdot AlCl_3$) and the vessel pressurized to 50 p.s.i. of propylene. The temperature was raised to 70° C. and the pressure and temperature maintained for 4 hours. The reaction was stopped at the end of this period and 2 ml. of methanolic HCl added. A tenfold excess of methanol was then added, the polymer washed with methanol, dried in vacuo, and weighed, yielding 17.5 grams of polymer of which 65.9% was hot heptane insoluble. The polymer prior to extraction had an intrinsic viscosity of 5.0 dl./g., the heptane insoluble portion having an intrinsic viscosity of 6.7 dl./g. (at 135° C. in decalin). (Intrinsic viscosities are reported as deciliter/gram.)

| | Bromine (wt. percent) |
|---|---|
| Whole polymer | 1.40 |
| Heptane insoluble | 1.29 |
| Heptane soluble | 2.73 |

When the reaction was carried out as described above without the addition of pyridine, only 10.8 grams of polymer were obtained, of which 65% was hot heptane insoluble, the polymer prior to extraction having an intrinsic viscosity of 4.6 dl./g., the heptane insoluble portion having an intrinsic viscosity of 6.2 dl./g.

*Example 2(A)*

Into a reaction vessel was introduced 100 ml. of dry n-heptane, 25.2 grams of 4-methylpentene-1, 2.3 grams of 8-bromooctene-1, 3 mM. diethyl aluminum chloride, 1 mM. of titanium trichloride AA and 1 mM. of pyridine. The reaction mixture was heated to 50° C. and maintained at that temperature for 2 hours. At the end of this time, heating was stopped, the reaction quenched by the addition of methanol, and the polymer isolated for a yield of 9.07 grams having an intrinsic viscosity of 4.1 dl./g. The polymer was found to have 11.3% of bromine and a number percent of bromooctene of 27.

When the polymerization was repeated as described above, except that pyridine was not added, the yield was only 2.54 grams of a polymer having an intrinsic viscosity of 1.3 dl./g., containing 8.84% bromine and a number percent of bromooctene of 21.1.

*Example 2(B)*

Into a reaction vessel was introduced 100 ml. of dry n-heptane, 20 ml. of 4-methylpentene-1, 1 ml. of 5-chloro-pentene-1, 0.48 gram of diethyl aluminum chloride and 0.48 gram of TiCl₃ AA and the reaction mixture heated to 50° C. and maintained at that temperature for 102 minutes. At the end of this time, heating was stopped, the reaction quenched by the addition of methanol, and the polymer isolated yielding 4.3 grams having an intrinsic viscosity of 2.1 dl./g. The polymer was found to have 3.14 weight percent chlorine and 9.3 number percent 5-chloropentene-1.

A slurry of 0.5 gram of the above product and 25 ml. of pyridine was refluxed for 20 hours. After cooling to room temperature, a large excess of methanol was added and the product was filtered. The product was washed several times with methanolic HCl and dried in vacuo, yielding 0.33 gram. Analysis showed 1.16% nitrogen, an almost quantitative displacement of the chlorine with pyridine to the quaternary ammonium compound.

*Example 3*

Into a pressure vessel was introduced 300 ml. of dry n-heptane, 6 mM. of ethyl aluminum sesquichloride (Al₂(C₂H₅)₃Cl₃), 3 mM. of vanadium oxychloride, 6.9 grams of 8-bromooctene-1, and 3 mM. of pyridine. The temperature was maintained in the range of 26 to 45° C. over a period of 1 hour, while propylene was introduced at the rate of 426 ml. per minute, and ethylene was introduced at a rate of 129 ml. per minute. A yield of polymer of 9.3 grams was obtained having an intrinsic viscosity of 1.0 dl./g. and 8.8 weight percent bromine.

When the above reaction was carried out in the absence of pyridine, only a trace of polymer was obtained.

*Example 4*

Into a pressure vessel was introduced 100 ml. of dry n-heptane, 3 mM. of diethyl aluminum chloride, 1 mM. of titanium trichloride, 2.3 grams of 8-bromooctene-1, 1 mM. of pyridine and the reaction pressurized to 50 p.s.i. of propylene and maintained at that pressure for 1 hour at 70° C. At the end of this time, the reaction was stopped by the addition of methanol and the polymer isolated. A yield of 11 grams of polymer was obtained of which 72% was hot heptane insoluble, the entire polymer having an intrinsic viscosity of 4.2 dl./g., the heptane insoluble portion having an intrinsic viscosity of 4.6 dl./g. The polymer was found to have 3.23 weight percent bromine, for a 7.22 number percent of 8-bromooctene-1.

Repeating the above reaction under the same conditions with the same amounts of reactants, the yields were 8.7 and 9.7 g., an intrinsic viscosity of 2.0 dl./g., 5.10 weight percent bromine, and 12.19 number percent of 8-bromo-octene-1 in the polymer.

When the above polymerization was carried out in the absence of pyridine, a yield of only 5 grams was obtained of which 80.7% was heptane insoluble.

The following table shows a number of examples carried out in accordance with Example 4, in which 5-bromopentene-1 is used rather than 8-bromooctene-1 and the additive is varied.

TABLE I

| 5-bromopentene-1, millimoles | Additive | Millimoles of additive | Yield of polymer, grams | Bromine (wt. percent) | [η] dl./g. | 5-bromo-1-pentene in copolymer, mole percent |
|---|---|---|---|---|---|---|
| 12 | --- | --- | 9.36 | --- | --- | --- |
| 12 | Pyridine | --- | 5.6 | 1.94 | 2.8 | 3.62 |
| 12 | do | 0.5 | 9.0 | 2.6 | 3.0 | 4.85 |
| 12 | do | 1.0 | 9.2 | 3.1 | 2.8 | 5.74 |
| 12 | do | 2.0 | 6.1 | 3.8 | 3.0 | 7.13 |
| 12 | (C₂H₅)₃N | 1.0 | 8.0 | 3.3 | 3.5 | 6.18 |
| 12 | Tetrahydrofuran | 1.0 | 6.9 | 2.6 | 3.0 | 4.92 |

Conditions of polymerization:
n-heptane—100 ml.    Temperature—70° C.
AlEt₂Cl —3 mM.    Propylene pressure—50 p.s.i.
TiCl₃AA —1 mM.    Time—1 hour Following the procedure of Example 4, but varying the ω-halo-1-olefin, the following table indicates the results obtained:

TABLE II

| ω-Halo-α-olefins | Yield, grams | [η] dl./g. | Chlorine or bromine, wt. percent | ω-Halo-α-olefin in copolymer, mole percent |
|---|---|---|---|---|
| 5-chloro-1-pentene | 7.8 | 2.7 | 1.38 | 4.07 |
| 6-chloro-1-hexene | 8.0 | 2.2 | 2.09 | 6.98 |
| 8-chloro-1-octene | 6.7 | 2.4 | 2.51 | 10.53 |
| 11-chloro-1-undecene | 8.6 | 2.4 | 2.46 | 13.10 |
| 4-bromo-1-butene | 3.2 | 2.0 | 1.68 | 2.84 |
| 6-bromo-1-hexene | 9.5, 8.6 | 2.6 | 2.84 | 5.80 |

Using the procedure of Example 4, except that no Lewis base additive was used, the following results were obtained with various ω-haloolefins:

TABLE III

| ω-Halo-α-olefins | Yield, grams | [η] dl./g. | Chlorine or bromine, wt. percent | ω-Halo-α-olefin in copolymer, mole percent |
|---|---|---|---|---|
| 5-chloro-1-pentene | 7.6, 6.6 | 2.1 | 0.73 | 2.15 |
| 6-chloro-1-hexene | --- | --- | --- | --- |
| 8-chloro-1-octene | --- | --- | --- | --- |
| 11-chloro-1-undecene | 8.2 | 2.9 | 1.30 | 6.92 |
| 4-bromo-1-butene | 2.2 | 1.5 | 1.44 | 2.43 |
| 6-bromo-1-hexene | (¹) | | | |
| 8-bromo-1-octene | 5.6, 4.6 | 2.2 | 2.93 | 7.00 |
| 5-chloro-1-pentene | ² 8.0, 10.0 | 6.2 | 0.62 | 1.83 |
| 8-chloro-1-octene | ² 7.0, 8.3 | 5.0 | 0.77 | 3.19 |

¹ 11.54 grams of low molecular weight tacky semisolid was isolated ([η]=0.2 dl./g.; Br=0.63%).
² Carried out at 50° C. for 2 hours.

The halogens present in the polymer readily react with various reagents known to react with primary halogens. The halogens may be replaced by amines to enhance the dyeability of the polymer. The halogens present in the elastomers may be used as sites for cross-linking or vulcanization. Other functionalities may be introduced, such as hydroxyl, cyano, olefins, etc.

Because all of the halogens are of the same order of reactivity, they react in the same manner toward a particular reagent. Reactions proceed smoothly at a uniform rate, modifying the polymer in a consistent manner. The uniformity of reactivity of the halogens is contrasted with that of the polymer in which halogen is introduced by halogenation, as indicated previously.

The polymers as obtained have a convenient viscosity for film and fiber formation. By virtue of their increased solubility in a variety of solvents, the polymers may also be dissolved in a solvent to form lacquers.

As will be evident to those skilled in the art, various modifications on this process can be made or followed, in the light of the foregoing disclosure and discussion, without departing from the spirit or scope of the disclosure or from the scope of the following claims.

I claim:

1. In a process for obtaining copolymers insoluble in boiling heptane of:
   (a) at least 1 hydrocarbon mono-α-olefin of from 3 to 6 carbons; and
   (b) an ω-halo-mono-α-olefin of from 4 to 16 carbons, wherein the halogen is chlorine or bromine;
   using a "Ziegler-type" catalyst containing a hydrocarbyl aluminum compound wherein the ratio of hydrocarbyl groups to aluminum is greater than one and the remaining valences of aluminum are satisfied by halogen atoms and titanium trichloride;
   the improvement which comprises adding from 0.2 to 5 moles per atom of titanium of an organic Lewis base of from 2 to 20 carbons having as its only hetero-atom an element of atomic number 7 to 8, all of whose valences are bonded to carbon.

2. A method according to claim 1, wherein said Lewis base is a tert.-amine.

3. A method according to claim 1, wherein said Lewis base is a pyridine compound of the formula

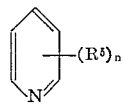

wherein $R^5$ is of from 1 to 6 carbons and $n$ is a cardinal number of from 0 to 3.

4. A method according to claim 3, wherein said pyridine compound is pyridine.

5. A method according to claim 1, wherein said Lewis base is an ether of the formula:

$$R-O-R'$$

wherein R and R' are hydrocarbyl radicals having a combined number of carbons of from 2 to 20.

6. A method according to claim 5, wherein said ether is tetrahydrofuran.

References Cited by the Examiner
UNITED STATES PATENTS

| | | | |
|---|---|---|---|
| 3,116,274 | 12/1963 | Boehm et al. | 260—94.9 |
| 3,222,330 | 12/1965 | Nyce et al. | 260—87.5 |

JOSEPH L. SCHOFER, *Primary Examiner.*

M. B. KURTZMAN, *Assistant Examiner.*